Sept. 25, 1956

V. G. KORFHAGE ET AL 2,764,115

BATTERY BURNING APPARATUS

Filed April 19, 1951

INVENTORS
VINCENT G. KORFHAGE
BY HENRY W. LORMOR

Hudson, Boughton,
Williams, David & Hoffmann
ATTORNEYS

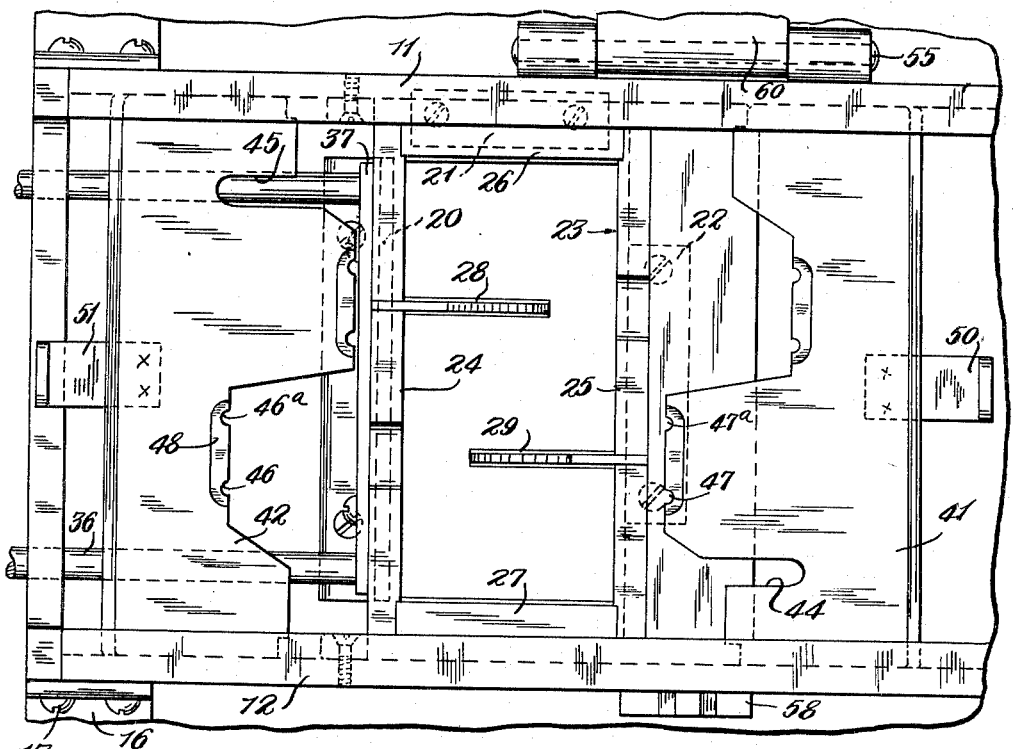
FIG. 5
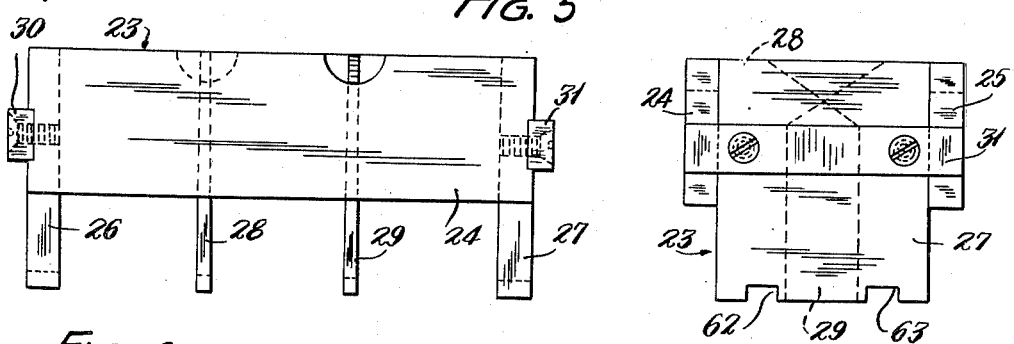
FIG. 6
FIG. 7
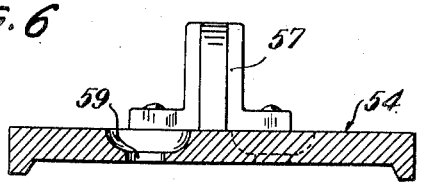
FIG. 8
INVENTORS
VINCENT G. KORFHAGE
BY HENRY W. LORMOR
ATTORNEYS

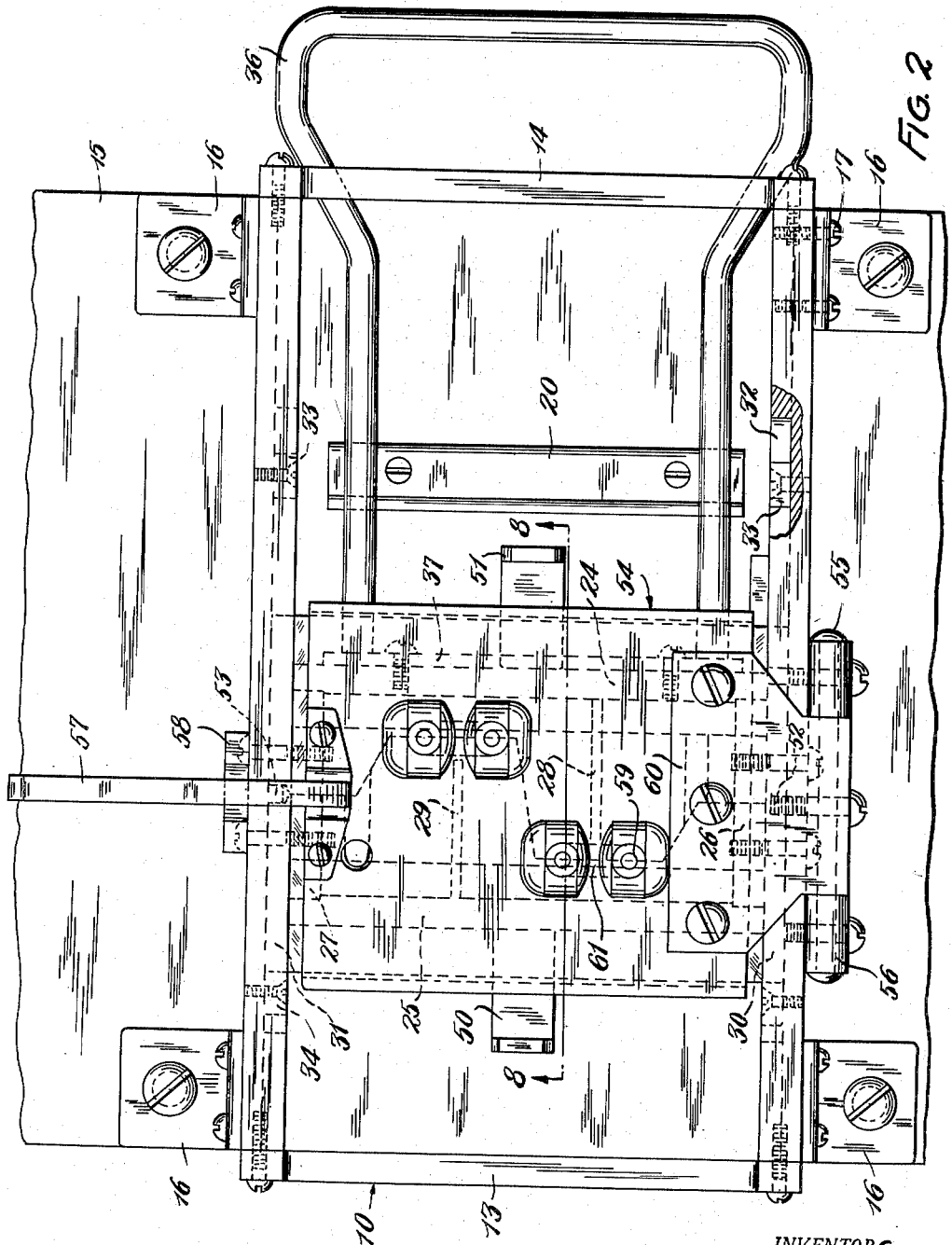

United States Patent Office 2,764,115
Patented Sept. 25, 1956

2,764,115

BATTERY BURNING APPARATUS

Vincent G. Korfhage, Cleveland, and Henry W. Lormor, Shaker Heights, Ohio, assignors to The Electric Storage Battery Company, a corporation of New Jersey Application April 19, 1951, Serial No. 221,774

9 Claims. (Cl. 113—59)

This invention relates to an apparatus for use in manufacturing storage batteries and, more particularly, to an apparatus for burning connectors to terminal posts of assembled storage battery elements and for facilitating insertion of the connected elements into a battery casing.

The conventional lead-acid storage battery comprises a plurality of cells, each provided with an element assembled from alternate positive and negative lead plates with separators or insulators therebetween. The positive and negative plates of each element are respectively connected to individual straps, each strap is provided with a terminal post, and adjacent elements are interconnected by so-called cross connectors applied to their terminal posts. These connectors each comprise a bar of lead, or antimony-lead, provided adjacent its ends with openings which are designed to receive the terminal posts of the adjacent elements which are to be connected together. After the connectors are fitted onto the posts they are lead-burned thereto by means of a flame or other heat producing means which is applied to each post and connector until the metal of the post and connector are fused together. In effecting this burning operation manually a relatively small flame is frequently employed which the operator moves about to melt portions of the post and the connector. This manipulation requires skilled operators since considerable practice is necessary to ensure proper fusion without excessive melting and without injury to the battery or intermediate parts of the connectors by the flame or by molten metal produced by the operation. The burning operation is particularly difficult to effect, and requires a special skill on the part of operators, when the connectors are to be applied to the assembled elements prior to the provision of the usual insulating cover or top of the cells. This is because the plates and separators in such a construction are directly accessible during the burning operation and are not protected, from droppings of the molten metal or from the flame of the torch, by the battery cover or top as in the more conventional batteries where the connectors are burned on after such tops or covers have been applied.

An object of the invention is to provide an improved apparatus for burning connectors to the terminal posts of assembled storage battery elements wherein the elements are supported, during the burning operation, in positions corresponding to those which they will occupy in a completed battery and are protected from injury by molten metal or the burning means during the burning operation.

Another object of the invention is to provide an improved apparatus for burning connectors to the terminal posts of assembled storage battery elements wherein the elements are supported, during the burning operation, in positions corresponding to those which they will occupy in a completed battery and are protected from injury by molten metal or the burning means during the burning operation, a means also being provided to facilitate placing the connected assembled elements in a battery casing.

A further object of the invention is to provide an improved apparatus for burning connectors to the terminal posts of assembled storage battery elements wherein the elements are supported, during the burning operation, in positions corresponding to those which they will occupy in a completed battery and are protected from injury during the burning operation by separable cover means movable to and from a position intermediate the tops of the elements and the tops of their terminal posts, the cover means having recesses in the top surface thereof adjacent the posts for supporting the connectors disposed on the posts, whereby the burning means cannot engage the elements and the recesses in the cover means act as molds to retain any molten metal, produced by the burning, in contact with the adjacent posts and connectors.

A still further object of the invention is to provide an improved apparatus for burning connectors to the terminal posts of assembled storage battery elements as defined in the preceding paragraph and wherein the apparatus is provided with a second cover member having parts disposable over the portions of the connectors intermediate the terminal posts so that access can be had to only the terminal posts and the limited portions of the connectors adjacent the posts, thus preventing injury to the intermediate portions of the connectors during the burning operation.

An additional object of the invention is to provide an improved apparatus for burning connectors to the terminal posts of assembled storage battery elements, prior to the placing of the usual covers thereon, wherein the elements are supported during the burning operation in positions corresponding to those they will occupy in a completed battery, the supporting being effected by an open-bottomed holder movable to and from a position in alignment over an open-topped battery casing to facilitate placing the connected battery elements into the casing, separable cover means also being provided to protect the elements from injury during the burning operation.

A still further object of the invention is to provide an improved apparatus of the type defined in the preceding paragraph and wherein the holder is so constructed as to frictionally retain the assembled battery elements in the holder so that the latter cannot move therefrom solely under the force of gravity, the element being displaceable from the holder by the application of an external force to the tops thereof after the burning opration has been completed.

The invention further resides in certain novel features of construction and combination and arrangements of the parts of the apparatus in which the invention is embodied, and further objects and advantages thereof will be apparent from the following description of the presently preferred embodiment of the invention which is illustrated in the accompanying drawings and wherein:

Fig. 2 is a top plan view of the apparatus with the upper cover member in closed position but without a battery casing in position to receive the assembled and connected elements;

Fig. 5 is a fragmentary plan view of the apparatus with the upper cover broken away and the separable cover means opened to show the element holder in position for placing connected battery elements into a battery casing, the elements and casing not being shown;

Fig. 6 is a detached side elevational view of the element holding means, per se;

Fig. 7 is an end elevational view of the element holding means, per se; and

Fig. 8 is a sectional view through the upper cover member, the view being taken on the line 8—8 of Fig. 2.

Figure 1:
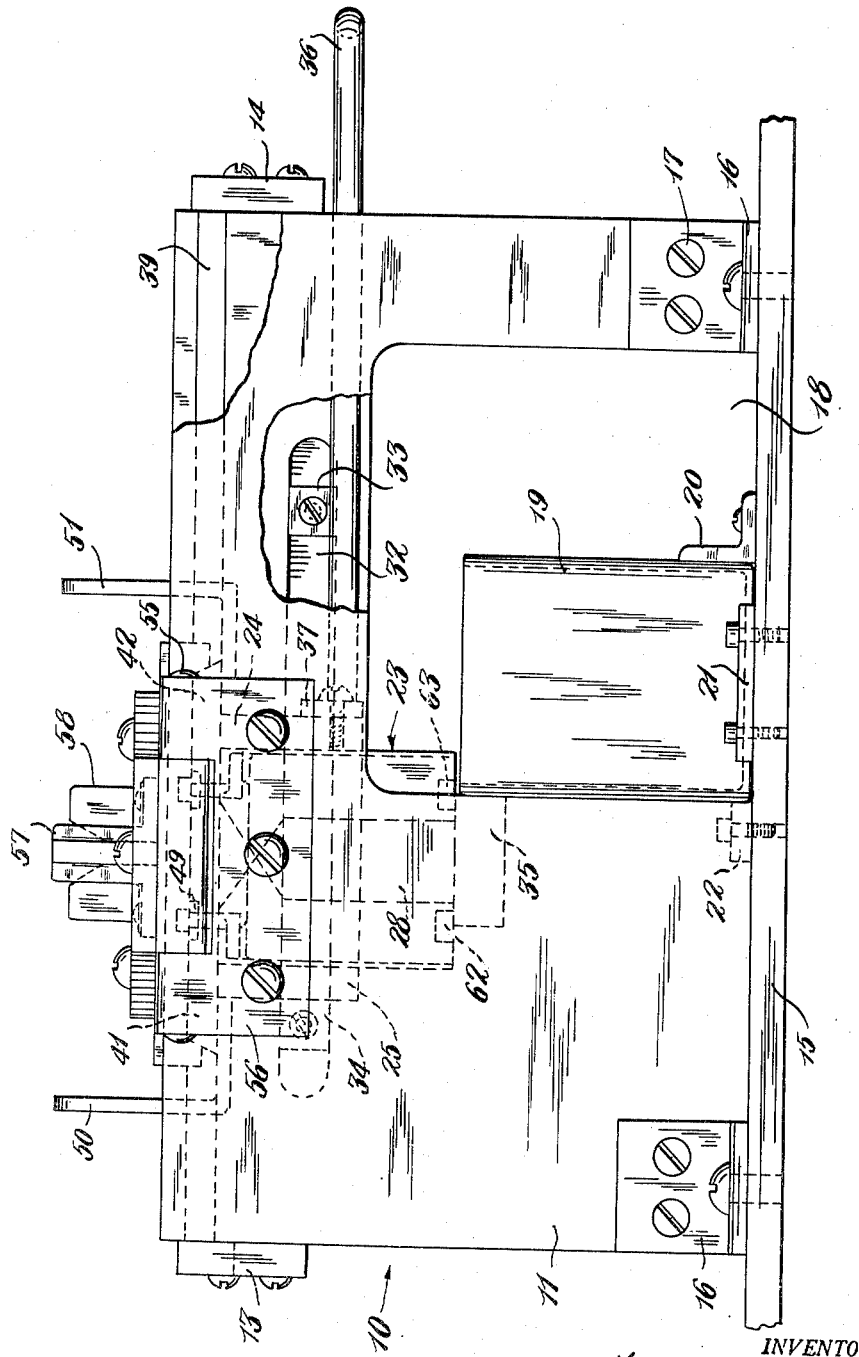
Fig. 1 is a side elevational view of the apparatus with parts broken away to better reveal the construction and showing an open-topped battery casing in place to receive assembled and connected battery elements.
Figure 3:
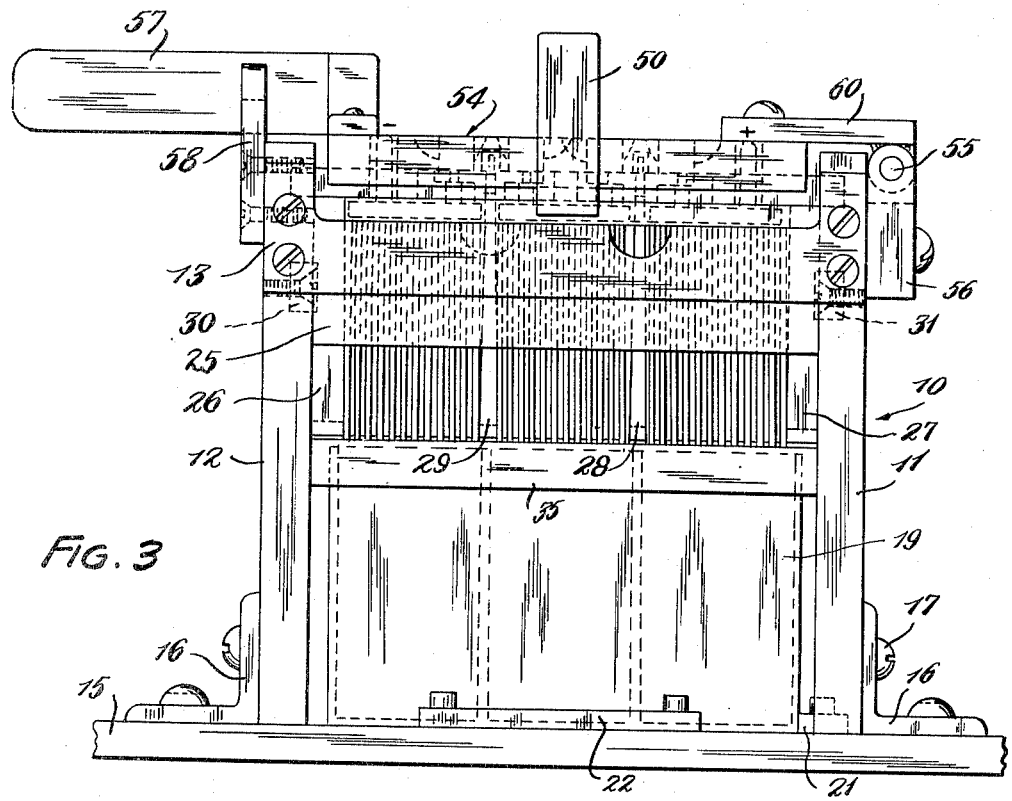
Fig. 3 is an end elevational view of the apparatus as seen from the left-hand side of Fig. 1 with assembled battery elements in place therein for burning of the connectors thereto, a battery casing also being illustrated as positioned in the apparatus for receiving the assembled and connected elements.

The illustrated apparatus comprises a frame means, generally designated 10, formed by a pair of horizontally spaced, vertically extending, side members 11 and 12 which are rigidly secured together adacent their tops by horizontally extending end members 13 and 14 bolted or otherwise secured to the side members. The bottoms of the side members 11 and 12 are rigidly secured to a base 15 by brackets 16 and suitable securing means such as bolts or machine screws 17. The side members 11 and 12 are each provided with an opening 18 extending upwardly from the base and of suitable size to slidably receive an open-topped battery casing 19 in upright position with the length of the casing extending transversely of the frame means 10. Adujstably secured to the base 15, intermediate the sides 11 and 12 of the frame, are stop members 20, 21 and 22 for accurately positioning an assembled and connected set of battery elements as will be hereinafter described. In the illustrated embodiment both side members 11 and 12 have been illustrated as provided with openings such as 18, but it will be readily apparent that by omitting one of such openings the corresponding side member could be made to serve as a stop means, thus eliminating the necessity for the stop 21. Preferably, however, the stop means 20, 21 and 22 are provided as shown to facilitate replacement and/or to permit adjustment for accommodating battery casings of different sizes.

An element supporting means or holder 23 is movably supported on the frame 10 for movement to and from a position above and in vertical alignment with a battery casing such as 19 positioned by the aforementioned stop members 20, 21 and 22. In the illustrated embodiment the holder 23 is rectangular and comprises four connected members forming the side walls 24, 25 and end walls 26, 27, the plates forming the end walls preferably extending below the lower edges of the side wall members such as 24, 25, as will be apparent from Fig. 6. The top and bottom of the holder are open and the internal dimensions of the holder are substantially equivalent to the external dimensions of the assembled and connected battery elements which are to be placed in the casing 19.

A partition member or wall 28 is secured to the side wall 24 of the holder at a point therealong which is approximately one-third of the length of the holder. This partition member extends transversely of the holder for a distance approximately two-thirds of its width, as will be apparent from Fig. 5. A similar partition member 29 is secured to the side wall 25 and also extends transversely of the holder 23 for a distance approximately two-thirds of its width, the member 29 being spaced from the end wall 27 a distance approximately one-third of the length of the holder. Preferably the upper corners of these partition members 28 and 29 are inclined, as will be apparent from Fig. 7, and both members taper in thickness from bottom to top, as will be apparent from Fig. 6. Also, the end walls 26 and 27 preferably are slightly thicker at the bottom than at the top by virtue of the inner surfaces thereof being inclined at a slight angle. The purpose of the tapers will be hereinafter described.

The end walls 26 and 27 of the holder 23 are each provided with a horizontally extending key 30 and 31, respectively, which are slidably received in horizontal grooves 32 in the side members 11 and 12, see Fig. 1. Sliding movement of the holder 23 relative to the frame 10 is limited by stop members 33, 34, secured in the grooves 32 at predetermined points therealong, thus limiting movement of the holder between two predetermined positions in one of which the holder is above and in vertical alignment with a battery casing 19. In its other predetermined position the holder 23 is positioned over a horizontally extending plate 35 suitably secured to the side members 11 and 12 of the frame 10 and acting as a bottom for the holder when the latter is positioned thereover as shown in Fig. 1. Movement of the holder 23 from one of the other of its predetermined positions is manually effected by means of a handle 36, which is preferably substantially U-shaped and has the inner ends thereof secured to a transversely extending plate 37 which is in turn affixed to the side member 24 of the holder. The length of the handle 36 is such that when the holder 23 is positioned over the plate 35 the outer end of the handle is easily accessible beyond the end of the frame means as will be apparent from Figs. 1 and 2.

Above the element supporting means or holder 23 the side members 11 and 12 of the apparatus are each provided with a horizontally extending keyway or groove 38, 39, respectively, for slidably supporting a separable cover means generally designated 40. This cover means, in the illustrated embodiment, comprises two separable plate members 41 and 42 which have their adacent edges adapted to interengage along an irregular meeting line 43 which passes sequentially through the center lines of the element terminal posts except for the two end posts of the assembled and connected elements, see Fig. 4. The plate 41 adacent one side thereof is provided with an elongated slot 44 extending transversely from the inner edge and positioned to accommodate one end terminal post of the assembled battery elements. The plate 42 of the cover means 40 is likewise provided with an elongated slot 45 extending inwardly of the plate from the dividing line 43 to accommodate the other end terminal post of the assembled elements. Between these two slots, the members 41 and 42 of the cover means are provided with pairs of cooperating arcuate openings such as 46, 46a and 47, 47a so located as to engage about the intermediate terminal posts of the assembled battery elements and provide a substantially close fitting circular closure thereabout.

Adjacent each pair of cooperating openings 46, 46a and 47, 47a, the top surfaces of the members 41, 42 of the cover means 40 are recessed, as indicated at 48, to accommodate terminal post connector members which are indicated in dotted lines at 49 in Fig. 1. As will be apparent from Fig. 4, the recesses 48 in the members 41 and 42 cooperate to provide a combined recess having a size and configuration substantially the same as the connectors 49 for the terminal posts of the battery elements so that the cover means 40 provides a substantially imperforate covering for the plates and separators in the region of the connectors without interfering with placing the latter upon the terminal posts. Moreover, the recesses 48, in effect, provide mold cavities so that any molten metal which would otherwise tend to run from the posts and connectors during a burning operation is confined.

Figure 4:
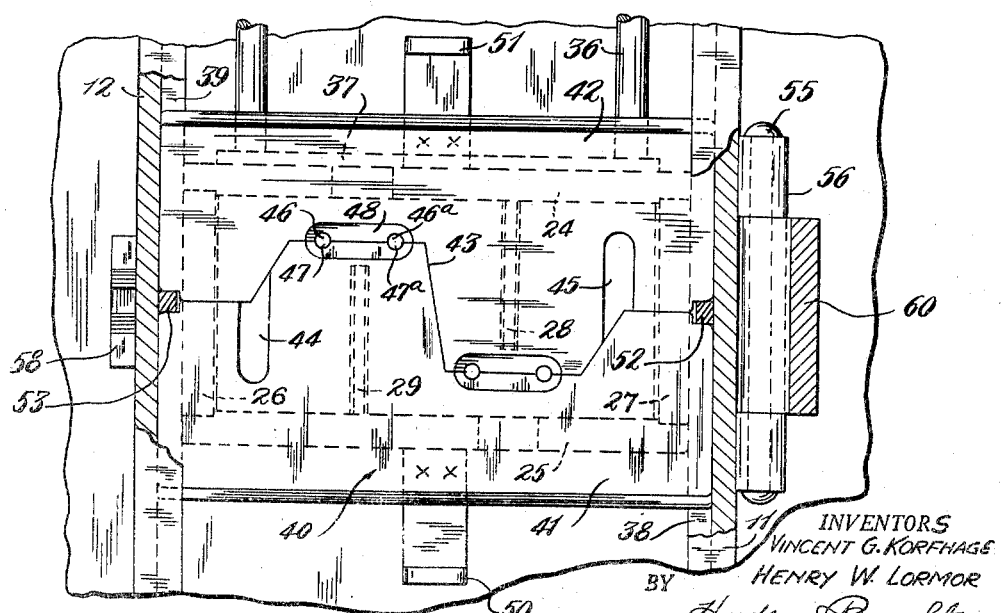
Fig. 4 is a fragmentary plan view of the apparatus with the upper cover broken away to illustrate the separable cover means for protecting the battery elements and for positioning the connectors during the burning operation.

The two plates or portions 41 and 42 of the cover means 40 are movable to and from the position indicated in Fig. 4 by handle members 50 and 51 secured thereto and the positions of the cover members 41, 42 may be accurately located relative to the element holder 23 by having a portion of the handle means extending beneath the cover members to abut the sides of the holder when the cover members or plates are in abutting relationship along the line 43 as shown in Fig. 4. Preferably, the stop members 52 and 53 are provided in the grooves 38 and 39 to establish a predetermined location of the portions 41, 42 of the cover means with respect to the holder 23 when the latter is over the plate 35. However, if desired, these stop members 52, 53 may be omitted when the handle members 50 and 51 are positioned to abut the sides of the holder 23 as just described.

The cover means 40 provides satisfactory protection for the battery elements during a burning operation when the cover is positioned as shown in Fig. 4, since, as noted above, only the connectors and the battery terminal posts are then exposed in the region where a flame will be employed. Moreover, the recesses such as 48 provide molds for confining any molten metal which would otherwise tend to flow from the connectors and terminal posts. However, inexperienced operators might engage the portions of the connectors intermediate the terminal posts, causing unnecessary melting of the latter. This might leave the upper surface of the connectors jagged, irregular, or otherwise injure the connectors, it being remembered that in order to secure a proper connection between the terminal posts and the connectors only a little of the metal of each need be melted. In order to protect the connectors, except in the portions which need be accessible by the heating torch or other means, a second cover means or member 54 is provided. This cover means or member 54 has one edge thereof hinged to one of the side members, such as 11, of the apparatus by a suitable pintle 55 and supporting plate 56 so that the cover 54 is movable to and from a position extending transversely of the apparatus at a position above the holder 23 and cover means 40 when the holder is located above the plate 35, see Fig. 1. To facilitate this movement of the cover means 54, it is preferably provided with a handle 57 which is adapted to be received in an upwardly extending notch of a member 58 secured to the side wall 12 of the apparatus. If desired, a latch mechanism, not shown, may be provided for cooperation with the handle 57 to retain the cover 54 in closed position.

The cover member 54 is substantially imperforate but is provided with openings 59 which are aligned with the pairs of openings such as 46, 46a, 47, 47a in the cover means 40 and correspond in spacing with the terminal posts of the assembled battery elements in the holder 23 when the latter is positioned over the plate member 35. The openings 44 and 45 in the cover 54 for the two end terminal posts of the assembled elements need not be accessible through the cover 54 since no burning thereof is to be effected and hence one of these openings is covered by the upper member or portion 60 of the hinge for the cover 54. Adjacent the openings 59 the top surface of the cover means 54 is suitably recessed to facilitate access to the terminal posts of the battery elements and the portions of the connectors immediately adjacent thereto. However, there is an imperforate portion 61 of the plate or cover 54 intermediate each of the pairs of adjacent openings 46, 46a, 47 and 47a of the cover 40 to cover and protect the portions of the connectors intermediate the terminal posts so that these portions of the connectors may not be reached by the flame used in burning the connectors to the posts. In addition to protecting the connectors 49 from the heating means or torch used in the burning operation, the said cover means also cooperates with the cover means 40 in retaining any molten metal, resulting from the burning operation, within the recesses 48.

In using the apparatus, the upper cover 54 is moved to its open position and the inner cover 40 has the two portions 41 and 42 separated providing access to the top of the battery element holder 23, which holder is then positioned above the plate 35. The spacing between the partition members 28, 29 of the holder 23 and between the said partition members and the adjacent end walls 26, 27 of the holder are such as to accommodate assembled battery elements and allow the latter to rest upon the plate 35. The dimensions of the parts are such that the slightly greater thicknesses of the partition walls and end walls of the holder, adjacent the bottoms, enable these portions of the walls to engage the adjacent sides of the battery elements to exert a frictional force thereon and thus prevent downward displacement of the battery elements from the holder when the later is initially moved from its position over the plate 35.

After the parts of the apparatus have been positioned as thus mentioned, assembled battery elements having their plates provided with connecting straps and upwardly extending terminal posts are placed in the holder. The two portions 41, 42 of the cover means 40 are then moved to closed position as indicated in Fig. 4 with the slots 44, 45 engaged about the end terminal posts and the pairs of openings such as 46, 46a, 47 and 47a positioned about the intermediate terminal posts of the battery elements, the said terminal posts extending above the cover means 40 when thus positioned. Connector members 49 for the battery are then placed over the terminal posts extending through the openings such as 46, 46a, 47, 47a with the connectors resting in the recesses 48. The cover member 54 is then moved to closed position and a suitable lead-burning means such as a flame or the like is applied to the openings 59 of the upper cover member, thus producing sufficient softening or melting of the terminal posts and adjacent portions of the connectors to unite them, as is well known in the art. This operation may be performed by unskilled labor, since the apparatus completely protects the battery elements and even the intermediate portions of the connectors from improper contact by the flame and the molten metal that might be produced thereby cannot contact the plates or separators of the battery elements. Moreover, even if excessive melting of the posts and adjacent portions of the connectors should be caused, the recesses 48 and the cover 54 serve as a mold to retain this metal in proper relationship about the terminal posts and the remaining portions of the connector members.

After the flame or other heating means is removed from the terminal posts of the battery, the cover 54 is swung to open position and the two portions 41, 42 of the cover 40 are separated. The operator then pulls on the handle 36, moving the holder 23 from its initial position to a position above a battery casing 19 which will have been slid into position either before, during, or immediately after the burning operation. The connected assembled battery elements may then be disposed in the battery casing by simply exerting a downwardly directed force on the elements, thus overcoming the slight frictional force imposed by the partition and end walls. In this downward movement, the connectors now secured to the terminal posts freely pass beyond the edges of the partitions 28, 29 by virtue of the fact that the latter do not extend entirely transversely of the holder as previously explained. With the elements thus disposed in the battery casing, the latter may now be removed from the apparatus since the end walls of the holder 23 and the partition walls 28, 29 are notched, as indicated at 62, 63, to accommodate the tops of the terminals of the battery during this removal. Alternatively, the vertical separation between the top of the empty casing 19 and the bottom of the holder may be such that sufficient clearance is provided for the terminal posts without need of such notches.

While the invention has been described in considerable detail with respect to the construction and mode of operation of the preferred embodiment, it will be apparent that changes may be made without departing from the spirit of the invention. Thus, as noted above, where the handle members 50, 51 for the separable cover members 41, 42 are so positioned as to abut the sides of the holder 23 when the cover members are in proper engagement along the meeting line 43, the stops 52, 53 in the grooves 38, 39 may be omitted. Alternatively, the stop members 52, 53 may be utilized and handle members 50, 51 need not then extend into abutting relationship with the holder. Also, as mentioned above, in some instances satisfactory operations can be effected without utilizing the second or upper cover member 54 depending upon the skill of the operators and the sizes of the batteries being handled. Furthermore, while the apparatus has been disclosed as having certain pairs bolted together, it will be evident that other means of securing may be utilized and that the dimensions of the parts will be such as to correspond with the sizes of the batteries and the number of cells thereof with which the apparatus is to be used. These and other changes are all considered as coming within the ambit of the invention the scope of which is defined in the subjoined claims.

Having thus described the invention, we claim:

1. An apparatus for lead-burning connectors to the terminal posts of assembled elements for a multi-cell storage battery comprising a frame including a pair of spaced vertically extending side members, a horizontally extending member secured to said side members between the tops and bottoms thereof, a holder open at top and bottom for a plurality of assembled battery elements supported for horizontal sliding movement between said side members to and from a position in which the said horizontally extending member forms a bottom for said battery elements supported in said holder, means at one side of said horizontally extending member and within the path of the horizontal sliding movement of said holder for positioning on open-topped battery casing vertically with the top thereof below the level of said horizontally extending member, means for moving said holder into vertical alignment with a battery casing in said positioning means for reception of the assembled elements from said holder, protective cover means including two separable portions slidably supported on said side members and adapted to be moved over battery elements in said holder intermediate the tops of the plates thereof and the tops of their terminal posts, the said portions having their adjacent edges adapted to engage and provide a cover over said elements with only the terminal posts extending thereabove, whereby connectors may be applied to said posts and burned thereto without damage to the battery elements, and the connected elements may then be placed as a unit in a casing.

2. An apparatus as defined in claim 1 and wherein the said holder has partitions extending inwardly from two opposite side walls in alternate spaced relationship providing separate compartments for the battery elements and the said partitions are thicker at the bottom than at the top so as to frictionally retain the elements in the holder but permit displacement vertically therefrom in response to application of an external force to the tops of the elements.

3. An apparatus for lead-burning connectors to the terminal posts of the assembled elements for a multi-cell storage battery comprising a frame including a pair of spaced vertically extending side members, a horizontally extending member secured to said side members between the tops and bottoms thereof, a holder open at top and bottom for a plurality of assembled battery elements supported for horizontal sliding movement between said side members to and from a position in which the said horizontally extending member forms a bottom for said battery elements supported in said holder, means at one side of said horizontally extending member and within the path of the horizontal sliding movement of said holder for positioning an open-topped battery casing vertically with the top thereof below the level of the said horizontally extending member, means for moving said holder into vertical alignment with a battery casing in said positioning means for reception of the assembled elements from said holder, protective cover means including two separable portions slidably supported on said side members and adapted to be moved over battery elements in said holder intermediate the tops thereof and the tops of their terminal posts, the said portions having their adjacent edges adapted to engage and provided with openings closely engageable about the said terminal posts, the upper surfaces of said portions having recesses adjacent the openings for the said terminal posts to support and position connectors disposed on said posts, and a cover member rotatably supported on one of said side members and movable to and from a position over the said protective cover means, the said rotatable cover member having openings for only the said posts and the adjacent portions of said connectors so that the portions of the connectors intermediate said posts are covered, whereby the posts and connectors may be united by the application of heat thereto without damage to the battery elements or the intermediate parts of said connectors and the connected elements may then be placed as a unit in a casing.

4. Apparatus for lead-burning connectors to the terminal posts of previously assembled and connected battery elements comprising a frame having vertical extending side members, a horizontal extending member secured to the side members intermediate the tops and bottoms and to one side thereof, a vertical holder open at the top and bottom thereof for supporting a plurality of assembled battery elements therefrom supported by said side members for horizontal sliding movement to and from a position over said horizontal extending member whereby the latter member acts as a support for the bottoms of said supported battery elements, at least one of said side members having an aperture therein on the opposite side from said horizontal extending member and within the path of the movement of said holder for receiving an open topped battery casing within said frame, and protective cover means including two separable portions slidably supported by said side members above the tops of the battery elements supported from said holder, said separable portions having their adjacent edges adapted to meet along an irregular line passing sequentially through the centers of the protruding terminal posts which are to receive a connector for defining apertures to receive the protruding terminal posts connected to said battery elements, the upper surface of said separable portions further arranged to have recesses adjacent said apertures for the terminal posts to support and to position connectors disposed on said posts.

5. An apparatus for lead-burning connectors to the terminal posts of the assembled elements for a multi-cell storage battery comprising a holder open at the top and bottom thereof for supporting a plurality of assembled battery elements in an arrangement corresponding to that which they will occupy in the completed battery, frame means for supporting said holder for horizontal movement, means within said frame means for positioning an open-topped battery casing within the path of movement of said holder and vertically at a lower level than said battery elements suspended from said holder, means secured intermediate the tops and bottoms of said frame means for supporting the bottoms of said battery elements only when received within said holder and disposed to permit the elements to be lowered into a casing when moved into alignment therewith, separable protective cover means movably mounted on said frame means and positionable over battery elements in said holder intermediate the tops of said elements and the tops of the terminal posts thereof, the said cover means including members having cooperating edges adapted to meet along the irregular line passing sequentially through the centers of the posts of the elements in the holder which are to be joined by connectors with cooperating openings in said edges engaging about the said posts so that only the latter project above the cover means and the other portions of the elements are protected by said cover means, whereby the said posts and connectors may be burned together without damaging the elements and the holder may thereafter be moved into alignment with a battery casing to facilitate placing the connected elements in the said casing.

6. An apparatus for lead-burning connectors to the terminal posts of the assembled elements for a multi-cell storage battery comprising a holder open at the top and bottom thereof for supporting a plurality of assembled battery elements in an arrangement corresponding to that which they will occupy in the completed battery, frame means for supporting said holder for horizontal movement, means within said frame means for vertically positioning an open-topped battery casing at a lower level than said battery elements supported in said holder and within the path of movement of same, means secured intermediate the tops and bottoms of said frame means for supporting the bottoms of said battery elements only when received within said holder and disposed to permit the elements to be lowered into a casing when moved into alignment therewith, separable protective cover means movably mounted on said frame means and positionable over battery elements in said holder intermediate the tops of said elements and the tops of the terminal posts thereof, the said cover means having openings through which only the element posts project and recesses adjacent said openings for positioning and supporting connector members relative to the element terminal posts, and a second cover member movably mounted on said frame means for movement to and from a position in which it covers said protective cover means and the portions of the connectors intermediate said terminal posts, the said second cover means having openings therethrough providing access to the element terminal posts and the portions of the connectors surrounding the said posts, whereby the said posts and connectors may be burned together without damaging the connectors or elements and the holder may thereafter be moved into alignment with a battery casing to facilitate placing the connected elements in the said casing.

7. Apparatus for lead-burning connectors to the terminal posts of previously assembled and connected battery elements comprising a frame having vertical extending side members, a horizontal extending member secured to the side members intermediate the tops and bottoms and to one side thereof, a vertically disposed holder open at the top and bottom thereof for supporting a plurality of assembled battery elements therein supported by said side members for horizontal sliding movement to and from a position over said horizontal extending member whereby the latter member acts as a support for the bottoms of said suspended battery elements, means within said frame members to position a battery casing within the path of movement of said holder and at a level below the bottoms of the assembled elements in said holder for receiving said elements therein, and protective cover means including two separable portions slidably supported by said side members above the tops of the battery elements suspended from said holder, said separable cover portions having their adjacent edges adapted to meet for defining apertures to receive the protruding terminal posts connected to said battery elements.

8. Apparatus for lead-burning connectors to the terminal posts of previously assembled and connected battery elements comprising a frame having vertical extending side members, a horizontal extending member secured to the side members intermediate the tops and bottoms and to one side thereof, a holder open at the top and bottom thereof for supporting a plurality of assembled battery elements therein supported by said side members for horizontal sliding movement to and from a position over said horizontal extending member whereby the latter member acts as a support for the bottoms of said suspended battery elements, said holder having downwardly converging sidewalls for preventing said assembled elements received therein from freely dropping therethrough and partition members secured to opposite sidewalls in alternate spaced relationship providing separate compartments for said assembled elements, said partitions being downwardly converging to frictionally retain said elements, at least one of said side members having an aperture therein on the opposite side from said horizontal extending member for receiving an open-topped battery casing within said vertical frame, means within said frame members to position a battery casing within the path of movement of said holder and at a level below the bottoms of the assembled elements in said holder for receiving said elements therein, protective cover means including two separable portions slidably supported by said side members above the tops of the battery elements supported from said holder, said separable portions having their adjacent edges adapted to meet along an irregular line passing sequentially through the centers of the protruding terminal posts which are to receive a connector for defining apertures to receive the protruding terminal posts connected to said battery elements, the upper surface of said separable portions being further arranged to have recesses adjacent said apertures for the terminal posts to support and to position connectors disposed on said post and a cover member rotatably supported on one of said side members for movement to and from a position over said protective cover means, said rotatable cover member having openings for only said posts and the immediately adjacent connector portion to be burned thereto.

9. An apparatus for securing connectors to the terminal posts of assembled elements for a multi-cell storage battery comprising a holder open at top and bottom for supporting a plurality of assembled battery elements in an arrangement corresponding to that which they will occupy in the completed battery, said holder comprising spaced side walls each having a partition member extending inwardly therefrom and spaced apart for providing separate compartments to receive the assembled battery elements and defined to frictionally retain said elements in said holder but permitting the release thereof upon the application of a force thereto; a frame including means for slidably supporting said holder for horizontal movements, separable protective cover means having openings through which only the element posts project, the said protective cover means having recesses in the top surface thereof adjacent and surrounding said openings for supporting the element connectors disposed on said posts and slidably mounted on said frame and cooperating with said holder for positioning over said elements and capable of being separated along the lines of said openings to allow the release of the elements from said holder, a second cover means mounted on said frame for movement to and from a position in which it covers the second protective cover means and the portions of said connectors intermediate said posts and having openings providing access to said terminal posts and the portions of the connectors surrounding said posts so that said posts and connectors may be burned together without damaging the connectors or elements, means to position a battery casing at a level lower than said holder for reception of the connected assembled elements, and means to move said holder with the connected elements therein into vertical alignment over a positioned casing thereby facilitating the placing of the connected elements in the casing by moving the elements downwardly from the holder.

References Cited in the file of this patent

UNITED STATES PATENTS

| | | |
|---|---|---|
| 1,486,803 | Ruckman | Mar. 11, 1924 |
| 1,542,405 | Pettibone | June 16, 1925 |
| 1,708,808 | Taylor | Apr. 9, 1929 |
| 1,932,136 | Hole | Oct. 24, 1933 |
| 2,265,413 | Young | Dec. 9, 1941 |
| 2,314,950 | Pope | Mar. 30, 1943 |
| 2,509,467 | Anderson | May 30, 1950 |
| 2,516,546 | Brown | July 25, 1950 |
| 2,539,318 | Orsino | Jan. 23, 1951 |
| 2,694,995 | Weideman | Nov. 23, 1954 |